United States Patent [19]

Umeda et al.

[11] Patent Number: 4,770,525
[45] Date of Patent: Sep. 13, 1988

[54] LIQUID CRYSTAL PROJECTOR

[75] Inventors: Osamu Umeda, Gifu; Masahiro Ogawa; Tatsuo Shimazaki, both of Tokyo, all of Japan

[73] Assignee: Casio Computer Co., Ltd., Tokyo, Japan

[21] Appl. No.: 25,019

[22] Filed: Mar. 12, 1987

[30] Foreign Application Priority Data

| Mar. 24, 1986 | [JP] | Japan | 61-42854[U] |
| Mar. 24, 1986 | [JP] | Japan | 61-42856[U] |
| Feb. 6, 1987 | [JP] | Japan | 62-15582[U] |

[51] Int. Cl.$^4$ .............................................. G03B 21/00
[52] U.S. Cl. ..................... 353/122; 353/38; 353/102; 353/84; 353/95
[58] Field of Search ........................ 353/84, 85, 86, 87, 353/120, 121, 102, 38, 102, 95, 22, 23, 122; 350/452

[56] References Cited

U.S. PATENT DOCUMENTS

| 1,762,932 | 6/1930 | Mihalyi | 353/102 X |
| 3,844,650 | 10/1974 | Nicholson . | |
| 3,895,866 | 7/1975 | De Quervain . | |
| 4,012,136 | 3/1977 | de la Croix et al. . | |
| 4,294,524 | 10/1981 | Stolov | 353/84 |
| 4,368,963 | 1/1983 | Stolov . | |
| 4,613,207 | 9/1986 | Fergason . | |
| 4,671,634 | 6/1987 | Kizaki | 383/38 X |

FOREIGN PATENT DOCUMENTS

| 105320 | 9/1938 | Australia | 353/38 |
| 2447595 | 9/1975 | Fed. Rep. of Germany . | |
| 3142664 | 5/1983 | Fed. Rep. of Germany . | |
| 62-25933 | 2/1987 | Japan . | |
| 294055 | 1/1954 | Switzerland | 353/102 |
| 941160 | 11/1963 | United Kingdom | 353/102 |
| A8505192 | 11/1985 | United Kingdom . | |

OTHER PUBLICATIONS

Patent Abstracts of Japan, vol. 8, No. 113 (P-276) (1550), 26th May 1984; & JP-A No. 59 19924 (Aporon Ongaku Kogyo) 01-02-1984.
Patent Abstracts of Japan, vol. 8, No. 92 (P-271) (1529), 27th Apr. 1984; & JP-A-59 7928 (Alps Denki) 17-01-1984.
Patent Abstracts of Japan, vol. 9, No. 116 (P-357) (1839), May 1985; & JP-A-No. 60 2916 (Suwa Seikosha) 09-01-1985.

Primary Examiner—Harry N. Haroian
Attorney, Agent, or Firm—Frishauf, Holtz, Goodman & Woodward

[57] ABSTRACT

In a liquid crystal projector wherein a light source is arranged behind a transmission liquid crystal display panel having a rectangular display portion, an image displayed on the liquid crystal display panel is enlarged by a projection lens, and an enlarged image is projected on the screen located in front of the liquid crystal display panel, a linear Fresnel lens is arranged between the light source and the liquid crystal display panel to narrow illumination light beam from the light source along only the widthwise direction of the rectangular display portion. When the illumination light beam from the light source is narrowed along only the widthwise direction of panel, the amount of unused light beam emitted outside the long sides of the display portion can be reduced, and the light beam from the light source can be effectively utilized for image projection.

10 Claims, 8 Drawing Sheets

LIQUID CRYSTAL PROJECTOR

BACKGROUND OF THE INVENTION

The present invention relates to an improvement in a liquid crystal projector.

In a conventional liquid crystal projector, a transmission type liquid crystal display panel displays an image, and the image on the panel is projected and enlarged on a screen surface. The conventional liquid crystal projector has the following arrangement.

Figure 1:
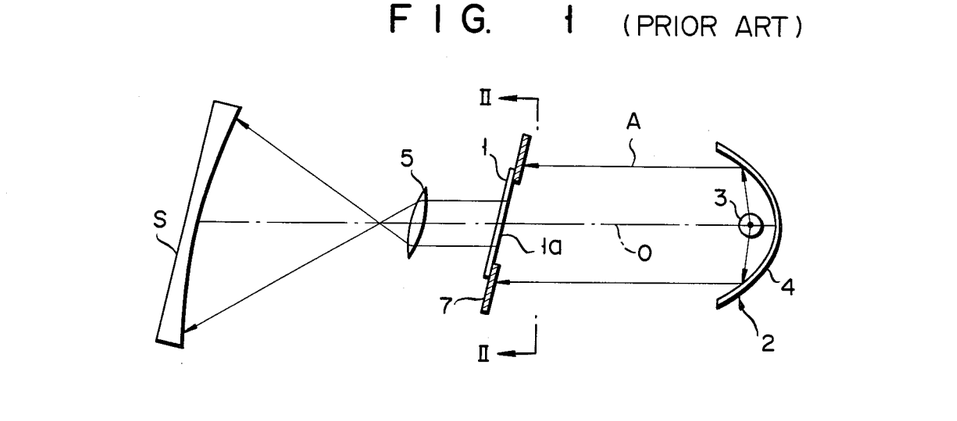
FIG. 1 is a longitudinal sectional view of an optical system of a conventional liquid crystal projector.

FIG. 1 shows a typical conventional liquid crystal projector. Reference numeral 1 in FIG. 1 denotes a transmission type dot-matrix liquid crystal display panel; and 2, a light source arranged behind panel 1. Light source 2 comprises lamp 3 and parabolic reflector 4 for reflecting light from lamp 3 in a direction parallel to optical axis O. Light source 2 thus emits illumination light A parallel to axis O toward panel 1. Reflector 4 in light source 2 in the liquid crystal projector comprises a parabolic reflector in FIG. 1. However, in a conventional liquid crystal projector using a conventional elliptical reflector as the light source reflector, a relay lens is arranged in the light source, and the light from the lamp is corrected by the relay lens to obtain collimated light. The collimated light is then incident on the liquid crystal display panel. Reference numeral 5 denotes a projection lens arranged in front of panel 1. The light passing through panel 1, i.e., an image displayed on panel 1 is enlarged by lens 5, and an enlarged image is projected onto screen S. Panel 1 is of a TN (Twisted Nematic) type. Panel 1 is inclined at a predetermined angle with respect to optical axis O such that illumination light A from the rear side of the panel has the highest efficiency. Reference numeral 7 denotes a frame-like light-shielding plate for supporting panel 1. Some of the beams of illumination light A from light source 2, which are incident on display portion (i.e., a display area) 1a of panel 1 pass through panel 1. However, the beams incident outside display portion 1a are shielded by panel 1 and light-shielding plate 7. Therefore, only the beams passing through display portion 1a of panel 1 are projected onto screen S.

The conventional liquid crystal projector enlarges and projects the image displayed on liquid crystal display panel 1 onto screen S. According to the liquid crystal projector, slide films need not be inserted or extracted, unlike in the conventional projector using slide films. In addition, the conventional liquid crystal projector can project an animation such as a television image onto the screen surface.

In the conventional liquid crystal projector described above, in order to perfectly project an image onto screen S, illumination light A must be incident on the entire surface of display portion 1a of liquid crystal display panel 1. The normal shape of display portion 1a of panel 1 is rectangular, while the shape of the cross section of light A from light source 2 is circular. If the beam spot of light A is small, the illumination beam is not incident on the corners of display portion 1a of panel 1, so that incomplete circular image is projected onto the surface of screen S.

In the conventional liquid crystal projector described above, the diameter of reflector 4 of light source 2 is selected to be large enough to cover the circumcircle of rectangular display portion 1a of panel 1, so that the entire display portion 1a of panel 1 can be illuminated. With the above arrangement, a perfect image without corner omissions can be projected onto screen S.

Figure 2:
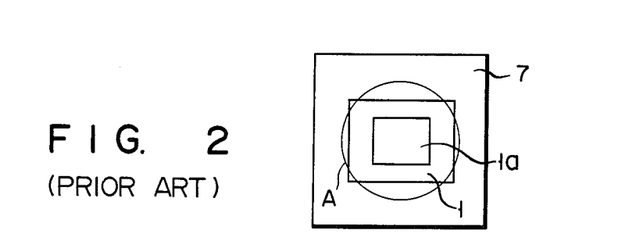
FIG. 2 is a sectional view of the optical system shown in FIG. 1 taken along the line II—II thereof.

In the conventional liquid crystal projector, however, since circular illumination light A is directly incident from light source 2 onto liquid crystal display panel 1, the amount of unused light (i.e, light shielded by the portion outside display portion 1a and by light-shielding plate 7) illuminating the portion outside portion 1a of panel 1 is increased. Therefore, light A from light source 2 cannot be effectively utilized. As described above, since the cross section of light A emitted from light source 2 and reflected by reflector 4 is circular while the shape of display portion 1a of panel 1 is rectangular, the amount of unused light emitting the portion outside display portion 1a is increased at portions above and below display portion 1a if panel 1 is located such that the longitudinal direction of display portion 1a extends horizontally, as shown in FIG. 2. Most of the beams of illumination light A from light source 2 are wasted.

SUMMARY OF THE INVENTION

The present invention has been made in consideration of the above situation, and has as its object to provide a liquid crystal projector wherein the amount of unused light emitted on portions excluding a display portion of the liquid crystal display panel is reduced to effectively utilize the illumination light from the light source for image projection, and at the same time the density of the light incident on the display portion of the liquid crystal display panel is increased to project a bright image onto the screen.

In order to achieve the above object of the present invention, there is provided a liquid crystal projector comprising a light source, a transmission liquid crystal display panel irradiated with a light beam from said light source and having a rectangular display portion, a projection lens, arranged on a line extending from an optical axis obtained by connecting said light source and said liquid crystal display panel, for enlarging an image displayed on said liquid crystal panel onto a screen, and optical means, arranged between said light source and said liquid crystal display panel, for narrowing the light beam along a widthwise direction of said rectangular display portion of said liquid crystal display panel.

With the above arrangement, if beams of the illumination light from the light source are focused by a linear Fresnel lens such that the width of the display portion of the liquid crystal display panel is decreased, but the length of the display portion is not changed. Only the width of the beam along the widthwise direction of the display portion is compressed to reduce the amount of unused light. The amount of light incident on the portion excluding the display portion of the liquid crystal display panel is reduced, and illumination light from the light source can be effectively utilized for image projection. However, in this conventional projector, the beams of the illumination light from the light source are focused by the linear Fresnel lens, and the focused beam is incident on the liquid crystal display panel. A relatively large amount of beams incident on the portions excluding the display portion can be incident on the display portion of the liquid crystal display panel to increase the intensity of light. Therefore, brightness of the liquid crystal display panel can be increased, and a bright image can be projected onto the screen surface.

DETAILED DESCRIPTION OF THE PREFERRED EMBODIMENTS

An embodiment of the present invention will be described with reference to the accompanying drawings.

Figure 3:
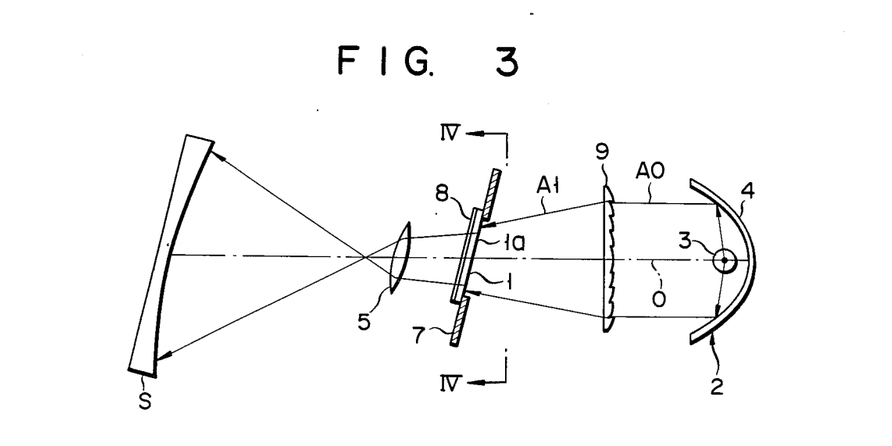
FIG. 3 is a longitudinal sectional view of an optical system of a liquid crystal projector according to a first embodiment of the present invention.
Figure 4:
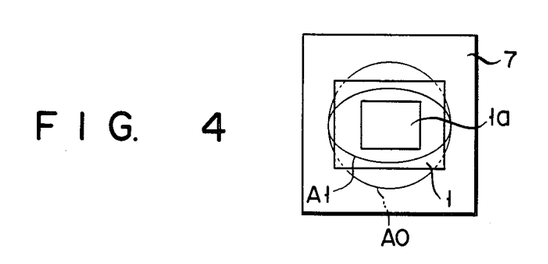
FIG. 4 is a sectional view of the optical system shown in FIG. 3 taken along the line IV—IV thereof.

Referring to FIG. 3, reference numeral 1 denotes a transmission type dot-matrix liquid crystal display panel whose display portion 1a has a rectangular shape. Panel 1 is supported by frame-like light-shielding plate 7 such that the longitudinal direction of display portion 1a is inclined with respect to optical axis O, as shown in FIG. 4. Panel 1 has primary color filter 8 on the front surface (the projection lens side) thereof, thus constituting a color liquid crystal display panel. Filter 8 comprises red (R), green (G), and blue (B) stripe filters RF, GF, and BF which are alternately arranged. Filters RF, GF and BF of color filter 8 respectively correspond to electrodes along the widthwise direction of display portion 1a, among the scanning and signal electrodes (not shown) of panel 1.

Reference numeral 2 denotes a light source, arranged behind liquid crystal display panel 1, for illuminating panel 1 from the lower surface thereof. Light source 2 comprises lamp 3 such as a Xenon lamp and parabolic reflector 4 for reflecting light from lamp 3 in a direction parallel to optical axis O, in the same manner as in the conventional liquid crystal projector shown in FIG. 1. Light source 2 emits illumination light A0 in a direction parallel to axis O toward panel 1. Reference numeral 5 denotes a projection lens arranged in front of panel 1. An image displayed on panel 1 is enlarged and projected by the projection lens onto screen S.

Figure 5:
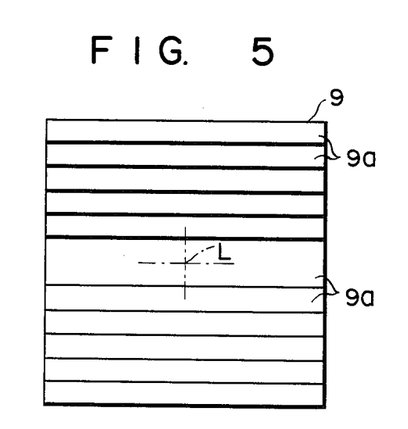
FIG. 5 is a front view of linear Fresnel lens 9 shown in FIG. 3.
Figure 6:
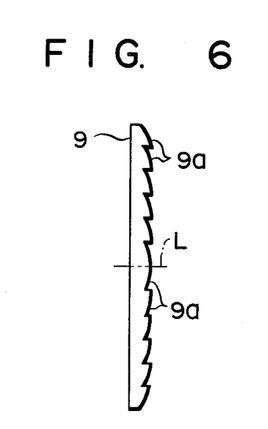
FIG. 6 is a side view of linear Fresnel lens 9 shown in FIG. 3.
Figure 7:
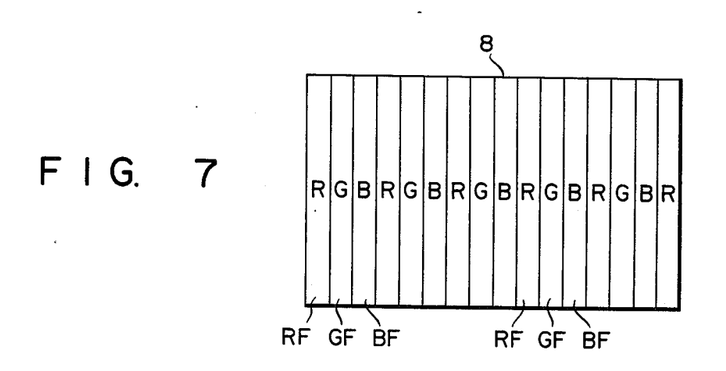
FIG. 7 is a front view of a primary color filter arranged on liquid crystal display panel 1.

Referring to FIG. 3, reference numeral 9 denotes a linear Fresnel lens arranged between light source 2 and liquid crystal display panel 1. Lens 9 comprises parallel stripe lens portions 9a formed symmetrically about center L of the lens, as shown in FIGS. 5 and 6. In this embodiment, a lens having a convex lens function is used as lens 9. Lens 9 is arranged between light source 2 and liquid crystal display panel 1 such that the lens surface is directed toward light source 2, that the longitudinal direction of stripe lens portions 9a is horizontal, and that center L of the lens is aligned with optical axis O of the projector.

Figure 8:
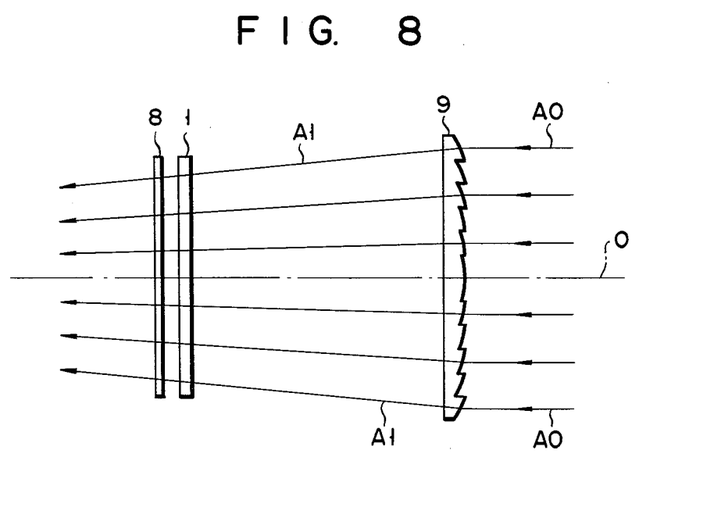
FIG. 8 is a view of an optical path of light transmitted through linear Fresnel lens 9 when viewed in the lateral direction.
Figure 9:
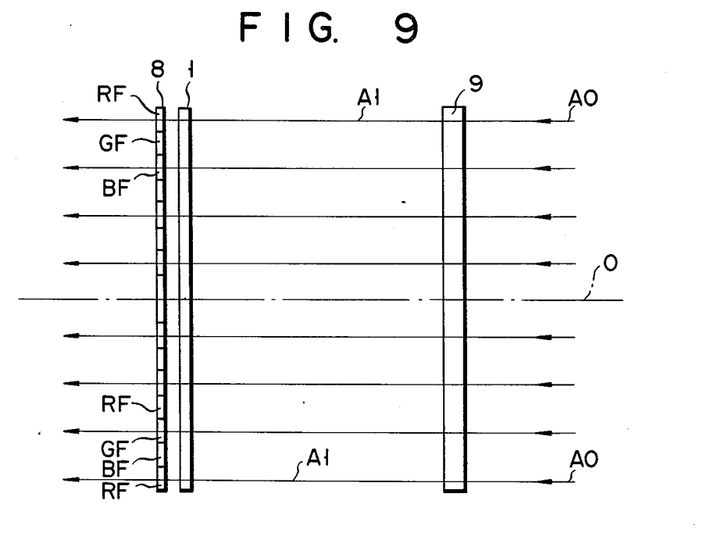
FIG. 9 is a view of the optical path of light transmitted through linear Fresnel lens 9 when viewed from the top.

Linear Fresnel lens 9 causes lens portions 9a to focus beams of illumination light A0 emitted from light source 2 parallel to optical axis O in the widthwise direction of lens portions 9a, i.e., in the vertical direction. Only the vertical width of circular illumination light A0 from light source 2 is compressed by lens 9, as shown in FIG. 8. However, the horizontal width of light A0 is not compressed and propagates straight, as shown in FIG. 9. Therefore, illumination light A0 from light source 2 is converted into elliptical illumination light A1 (FIG. 4) obtained by compressing the vertical width corresponding to the width of rectangular display portion 1a of liquid crystal display panel 1. Light A1 is then incident on panel 1. Light A1 is obtained by compressing light A0 in only the vertical direction. If a beam spot of illumination light A0 from light source 2 is sufficiently larger than the length (i.e., a longitudinal width) of display portion 1a of panel 1, display portion 1a can be entirely illuminated. If a distance between linear Fresnel lens 9 and panel 1 is selected according to the focal length of lens 9 to the extent that the minor axis of elliptical light A1 focused by lens 9 is not smaller than the width of rectangular display portion 1a, display portion 1a can be entirely illuminated with light A1.

In the liquid crystal projector of this embodiment, since linear Fresnel lens 9 is arranged between light source 2 and liquid crystal display panel 1 to compress the beams of light A0 from light source in only the widthwise direction of rectangular display portion 1a of panel 1, the beam width corresponding to the length of display portion 1a of panel 1 is not compressed (i.e,. the width is the one which allows illumination of the entire area of display portion 1a), and only the beam width corresponding to the width of display portion 1a is compressed to the extent that the minor axis of the beam spot is not smaller than the width of display portion 1a. The resultant elliptical light is then incident on panel 1.

According to the liquid crystal projector of this embodiment, as compared with the conventional liquid crystal projector wherein illumination light from light source 2 is directly incident on panel 1, the amount of beams for illuminating both short sides of display portion 1a can be reduced. The amount of unused light illuminating portions, excluding display portion 1a of panel 1, can be reduced, and therefore illumination light from light source 2 can be effectively projected. In addition, in the liquid crystal projector of this embodiment, the beams of illumination light A0 from light source 2 are focused by linear Fresnel lens 9, and the focused light is incident on panel 1. Most of the unused beams incident on portions excluding the display portion can be incident on display portion 1a, thus increasing the intensity of light incident thereon. Therefore, brightness of panel 1 can be increased. A bright image can be projected onto screen S. In the above embodiment, stripe filters RF, GF, and BF of primary color filter 8 for displaying a full-color image on panel 1 are formed so as to correspond to electrodes along the compression direction of the illumination light, i.e., the widthwise direction of display portion 1a, among scanning and signal electrodes of panel 1. Light focused by lens 9 and obliquely incident on color filter 8 through panel 1 is incident on filters RF, GF, and BF at an inclination along the longitudinal direction thereof. The beams do not become incident on the adjacent two of filters RF, GF, and BF, thus eliminating color interference. Therefore, a clear color image free from color misregistration and irregularity can be projected onto screen S.

Figure 10:
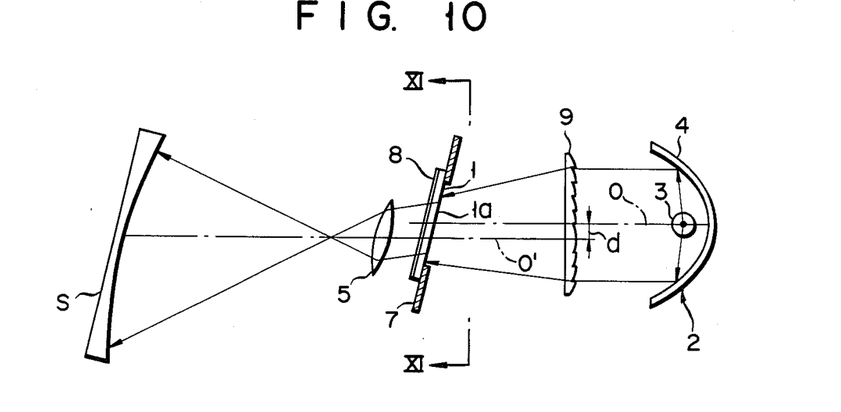
FIG. 10 is a longitudinal sectional view of an optical system of a liquid crystal projector according to a second embodiment of the present invention.
Figure 11:
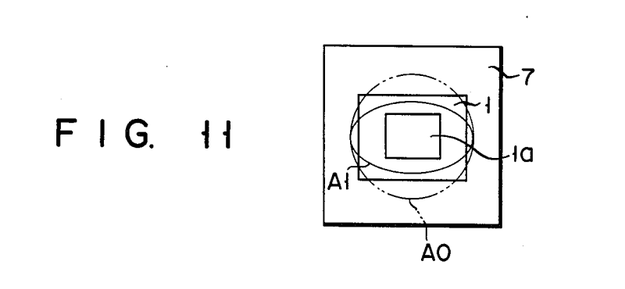
FIG. 11 is a sectional view of the optical system shown in FIG. 10 taken along the line XI—XI thereof.

FIGS. 10 and 11 show a second embodiment of the present invention. In this embodiment, linear Fresnel lens 9 comprises an eccentric linear Fresnel lens which has the center located below optical axis O of the projector by predetermined distance d. Liquid crystal display panel 1 is inclined such that its center is aligned with optical axis O of the light source. Projection lens 5 and screen S are inclined to be parallel to liquid crystal display panel 1 such that the centers of lens 9 and screen 5 are aligned with projection side optical axis O' passing through the center of lens 9. The liquid crystal projector according to this embodiment aims at illuminating with uniform luminance the entire area of display portion 1a of obliquely arranged panel 1. More specifically, when panel 1 is obliquely arranged with respect to the optical axis, the length of an optical path from light source 2 to the upper edge of display portion 1a of panel 1 is different from the length of an optical path from light source 2 to the lower edge of display portion 1a. Brightness at the upper edge of the display portion 1a near light source 2 increases, while brightness at the lower edge of the display portion 1a away from light source 2 decreases. However, according to this embodiment, when linear Fresnel lens 9 comprises an eccentric linear Fresnel lens having the center located below the light source side optical axis by predetermined distance d, a difference between the length of the optical path from light source 2 to the upper edge of display portion 1a and the length of the optical path from light source 2 to the lower edge of display portion 1a can be decreased. Therefore, light with uniform luminance can be emitted onto the entire surface of display portion 1a of obliquely inclined panel 1, and an image with uniform luminance can be projected onto screen S.

In the above embodiment, the longitudinal direction of display portion 1a of liquid crystal display panel 1 is aligned with the horizontal direction. However, the longitudinal direction of display portion 1a of panel 1 may be aligned with the vertical direction, and an image having a rectangular shape having long sides aligned with the vertical direction may be projected onto the screen surface. In this case, parallel lens portions of linear Fresnel lens are aligned in the vertical direction, and the beams are focused in only the widthwise direction of display portion 1a of panel 1. The above embodiment is a color liquid crystal projector for projecting a color image on a color liquid crystal display panel. The present invention can apply to a liquid crystal projector for projecting a black-and-white image onto a liquid crystal display panel.

A third embodiment of the present invention will be described with reference to the accompanying drawings.

Figure 12:
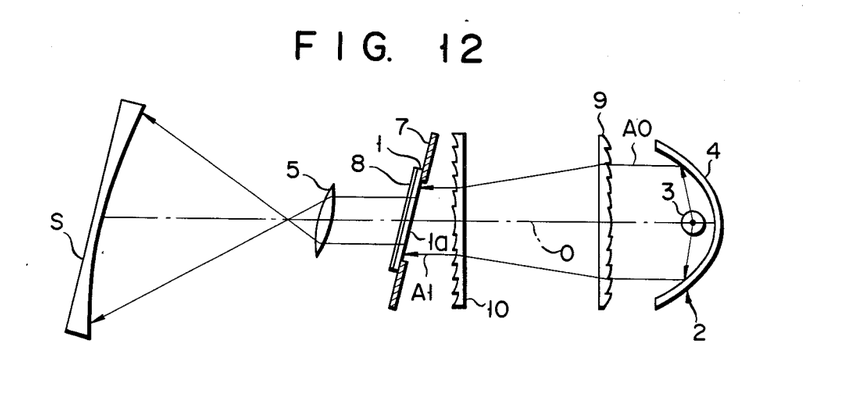
FIG. 12 is a longitudinal sectional view of an optical system of a liquid crystal projector according to a third embodiment of the present invention.

FIG. 12 is an arrangement of this embodiment in which second Fresnel lens 10 is added to the optical system shown in FIG. 3.

Figure 13:
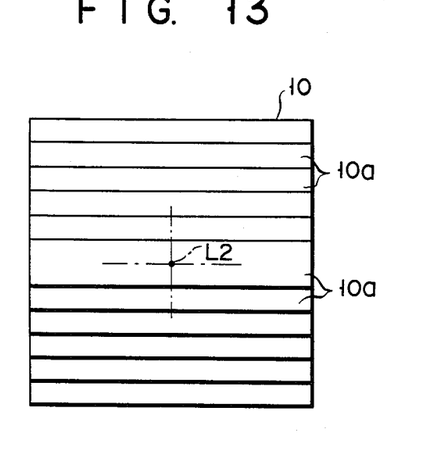
FIG. 13 is a front view of second linear Fresnel lens 10 shown in FIG. 12.
Figure 14:
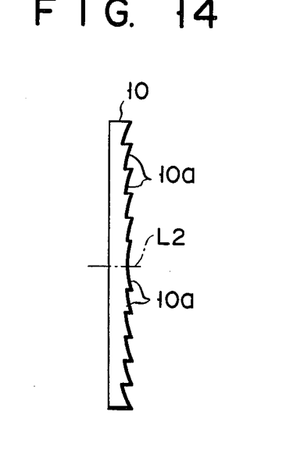
FIG. 14 is a side view of second linear Fresnel lens 10 shown in FIG. 12.

Referring to FIG. 12, reference numerals 9 and 10 denote first and second linear Fresnel lenses arranged between light source 2 and liquid crystal display panel 1. Lens 9 has a convex lens function, as shown in FIGS. 5 and 6. Lens 10 has a concave lens function, as shown in FIGS. 13 and 14. Lenses 9 and 10 have parallel lens portions 9a (FIGS. 5 and 6) and 10a symmetrical about centers L1 and L2 of lenses 9 and 10. Lens 9 is located on the side of light source 2 and its lens surface is directed toward light source 2. Lens 10 is located on the side of panel 1 and its lens surface is directed toward panel 1. A distance between lenses 9 and 10 is shorter than the focal length of lens 9. Centers L1 and L2 of lenses 9 and 10 are aligned with optical axis O such that the longitudinal directions of lens portions 9a (FIGS. 5 and 6) and 10a are aligned with the horizontal direction.

Figure 15:
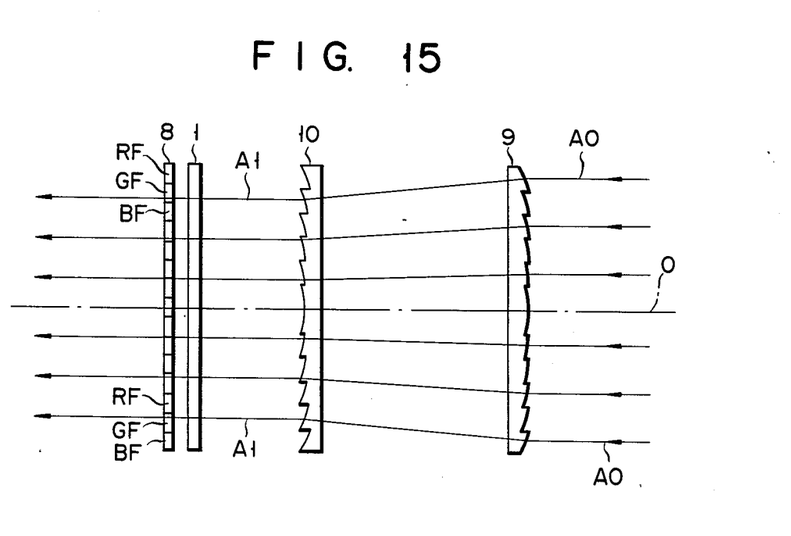
FIG. 15 is a view of an optical path of light passing through linear Fresnel lenses 9 and 10 in the lateral direction.
Figure 16:
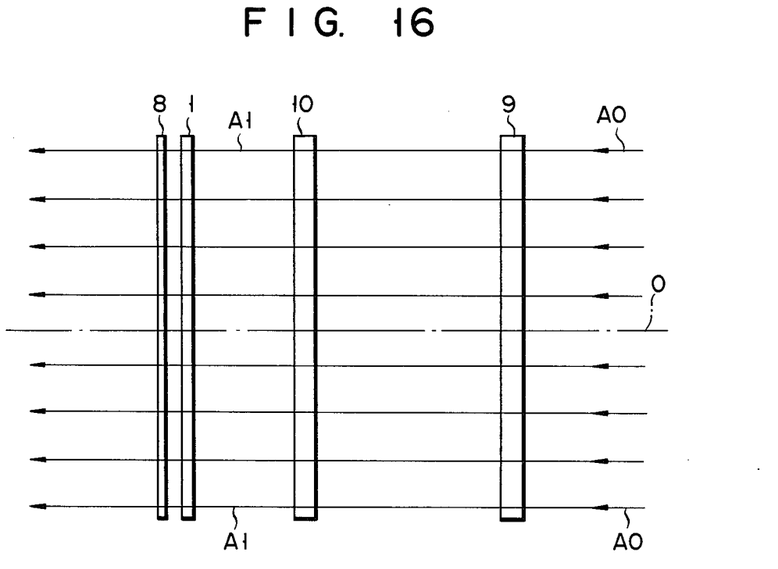
FIG. 16 is a plan view of the optical system showing paths of light.

First linear Fresnel lens 9 aims at focusing beams of illumination light A0 parallel to optical axis O and emitted from light source 2 along the widthwise, i.e., vertical direction of lens portions 9a. Illumination light A0 having a circular cross section passes through lens 9 and the vertical width is compressed by the focusing behavior of lens 9, as shown in FIG. 15. In this case, the horizontal width is not compressed, and light A0 propagates straight, as shown in FIG. 16. Lens 10 converts the beams having the vertical width compressed by lens 10 into the beams parallel to optical axis O. The light focused by lens 9 and obliquely incident on lens 10 is scattered by the scattering behavior of lens 10, as shown in FIG. 15, thereby obtaining light parallel to axis O. Light propagating straight without being influenced by the focusing behavior of lens 9 passes through lens 10 and propagates straight, as shown in FIG. 16. Therefore, only the vertical width of illumination light A0 (i.e., only the widthwise direction of display portion 1a of panel 1) having a circular cross section and emitted from light source 2 is compressed to obtain parallel light A1 having an elliptical cross section, as shown in FIG. 4. If the beam range of light A0 from light source 2 is sufficiently larger than the length of display portion 1a of panel 1, the entire area of display portion 1a along the direction of length can be illuminated. When the distance between lenses 9 and 10 is selected according to the focal length of lens 9 such that the vertical width of the beams is corrected by lens 10 into light parallel to axis O to the extent that the vertical width is not smaller than the width of display portion 1a, the entire area of display portion 1a along the vertical direction can be illuminated with light.

Since first linear Fresnel lens 9 for focusing the beams of illumination light A0 from light source 2 along the widthwise direction of display portion 1a of panel and second linear Fresnel lens 9 for correcting the beams compressed by lens 9 along the vertical direction to beams parallel to axis O are arranged in the liquid crystal projector described above, the width (i.e., the width enough to illuminate the entire area of display portion 1a) of illumination light A0 from light source 2, i.e., the longitudinal direction of display portion 1a of panel 1, is not compressed. Only the width of light along the widthwise direction of display portion 1a is compressed, and panel 1 is illuminated with the resultant light. According to the liquid crystal projector of this embodiment, as compared with the conventional liquid crystal projector wherein illumination light from light source 2 is directly incident on panel 1, the amount of unused beams illuminating the both long sides of display portion 1a can be reduced. The amount of unused beams illuminating portions excluding display portion 1a of panel 1 can be reduced. Therefore, illumination light from light source 2 can be effectively utilized for image projection. In the liquid crystal projector of this embodiment, illumination light A0 from light source 2 is focused, and panel 1 is illuminated with the focused light. A large amount of unused beams emitted on the portions excluding the display portion can be incident on display portion 1a of panel 1. The intensity of light incident on display portion 1a can be increased. Therefore, brightness of panel 1 can be increased, and a bright image can be projected onto screen S.

Figure 17:
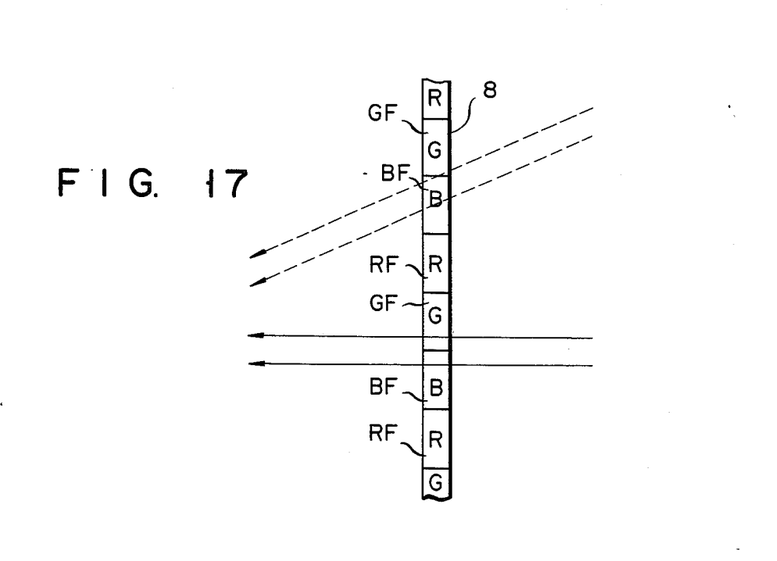
FIG. 17 is a view of an optical path of light passing through a color filter formed on the front surface of liquid crystal display panel 1.

In this liquid crystal projector, the width of the beam is narrowed or compressed by first linear Fresnel lens 9, and the resultant light is converted by second linear Fresnel lens 10 into light parallel to the optical axis O. The light from lens 10 is incident on liquid crystal display panel 1. The light passing through display portion 1a of panel 1 is not subjected to a color mixture when it passes through color filter 8 formed on the front surface of panel 1. More specifically, when light having a width compressed by lens 9 is directly incident on panel 1, the beams are obliquely incident on display portion 1a in the vertical direction of panel 1. In this case, the beams passing through display portion 1a obliquely pass through color filter 8, as indicated by the broken line in FIG. 17. A beam passing through the boundary between two adjacent filters of stripe filters RF, GF, and BF is colored with the corresponding two colors, thus resulting in a color mixture. However, as described above, the light from lens 9 is converted by lens 10 into light parallel to axis O, and the resultant light is incident on panel 1. The light passing through display portion 1a of panel 1 passes through color filter 8, as indicated by the solid line in FIG. 9, thus preventing a double color mixture. As a result, a clear color image free from color misregistration and irregularity can be projected onto screen S.

Figure 18:
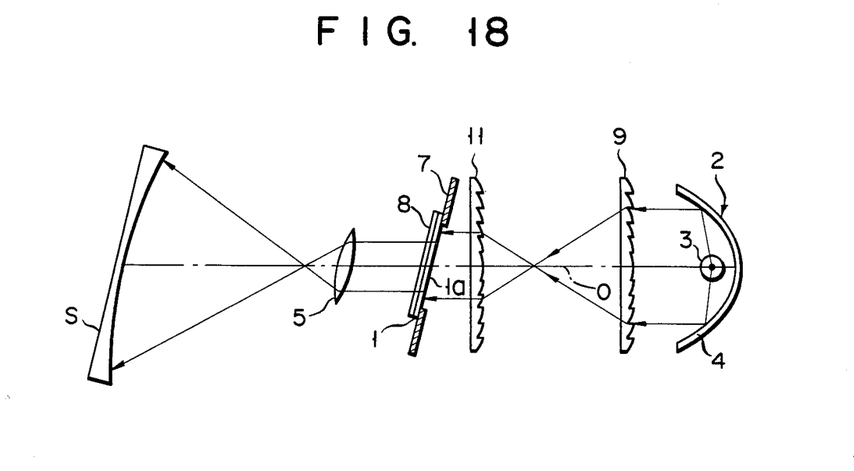
FIG. 18 is a longitudinal sectional view of an optical system of a liquid crystal projector according to a fourth embodiment of the present invention.

FIG. 18 shows a fourth embodiment of the present invention. In this embodiment, a second linear Fresnel lens for converting light having a width compressed by first linear Fresnel lens 9 into light parallel to optical axis O comprises linear Fresnel lens 11 having the same function (i.e., the convex lens function) as that of first linear Fresnel lens 9. Lens 11 is spaced apart from lens 9 by a distance larger than the focal length of lens 9 while the lens surface of lens 11 is directed toward lens 9. The same effect as in the above embodiment can be obtained in this embodiment.

In the third and fourth embodiments, the longitudinal direction of display portion 1a of panel 1 is aligned with the horizontal direction. However, panel 1 may be located such that the longitudinal direction of display portion 1a is aligned with the vertical direction. In this case, an image is displayed on display portion 1a having long sides aligned with the vertical direction. The lens portions of first linear Fresnel lens 9 and second linear Fresnel lens 10 or 11 are aligned with the vertical direction to narrow the beam along only the widthwise direction of display portion 1a of panel 1. The above embodiment exemplifies a color liquid crystal projector for projecting a color image on a screen using a color liquid crystal display panel. However, the present invention is also applicable to a liquid crystal projector for projecting a black-and-white image on a liquid crystal display panel.

Figure 19:
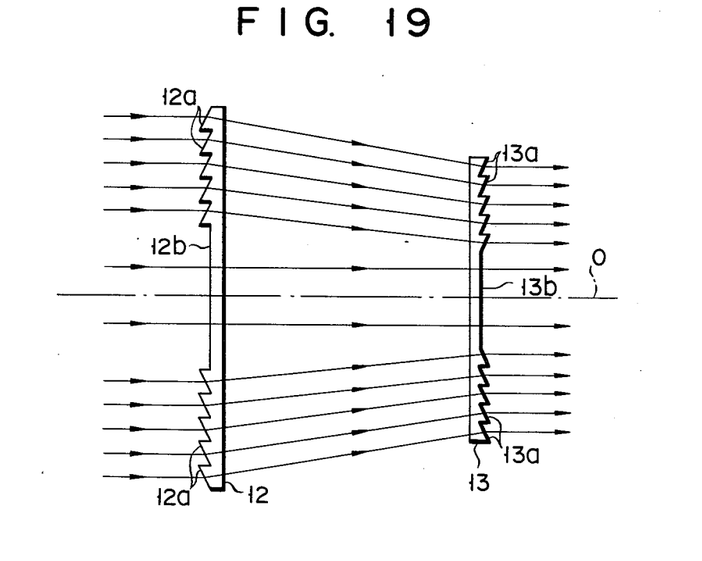
FIG. 19 is a longitudinal sectional view of an optical path of light passing through beam compression lens 12 and correction lens 13 when viewed in the lateral direction, according to a fifth embodiment of the present invention.
Figure 20:
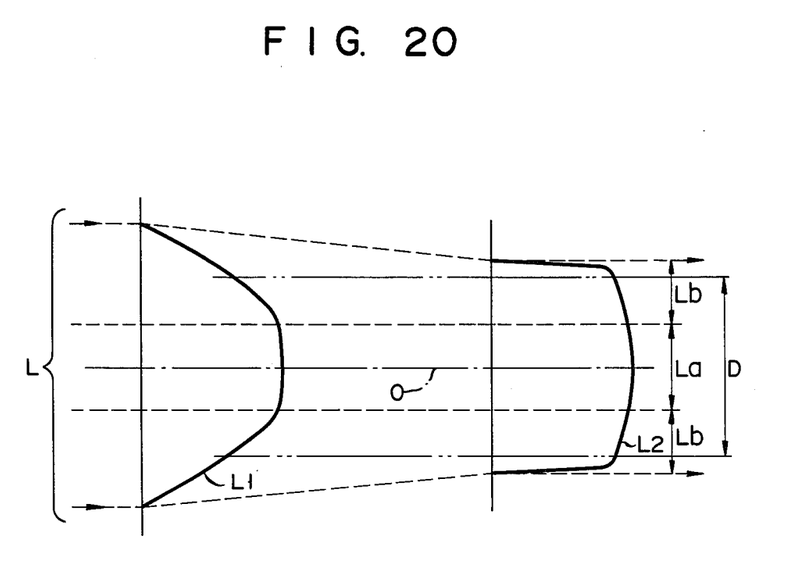
FIG. 20 is a graph showing luminance distribution of beams emitted from the light source and incident on beam compression lens 12 and beams passing through lenses 12 and 13.

FIGS. 19 and 20 show a fifth embodiment of the present invention. Reference numeral 12 denotes a beam compression lens for focusing outer beams of light emitted from light source 2 into an interior area of display area of liquid crystal display panel 1. Reference numeral 13 denotes a correction lens for correcting the light focused by lens 12 into light parallel to optical axis O. As shown in FIG. 19, lenses 12 and 13 comprise circular Fresnel lenses of transparent plates such as acrylic resin plates having concentric lens portions 12a and 13a, respectively. Lens 12 has a surface area slightly larger than the cross-sectional area of light emitted from light source 2. The central portion of lens 12 corresponding to the central portion of light from light source 2, i.e., the portion having the highest intensity, comprises circular flat portion 12b having no lens function. Concentric convex lens portions 12a are contiguous with flat portion 12b. Beams with a high intensity emitted from light source 2 and incident on flat portion 12b propagate straight. Beams having a low intensity incident on lens portions 12a are focused toward the center of light emitted from light source 2, so that the intensity of the outer beams of light from lens 12 is also high. Lens 13 is located at a position immediately before the focused outer beams are mixed with the central straight beams (the beams passing through flat portion 12b of lens 12). Lens 13 comprises central circular flat portion 13b through which the beams passing through lens 12 propagate straight, and concentric concave lens portions 13a for receiving outer beams focused by lens 12. The central beams passing through lens 12, i.e., the beams incident on flat portion 13b, propagate straight. The outer beams focused by lens 12 are corrected by lens portions 13a into beams parallel to optical axis O. The parallel light is incident on panel 1. Lens 13 has a surface area slightly larger than the display area of panel 1. The focusing power of lens 12 is determined such that the width of light corrected as parallel light by lens 13 is not smaller than the width of display area of panel 13.

FIG. 20 shows luminance distribution L1 of the cross section of light L emitted from light source 2 and incident on lens 12 and luminance distribution L2 of cross section of light corrected by lens 12 into parallel light. Reference symbol La in FIG. 20 denotes a straight propagation area of the center beams; Lb, the focusing area of outer beams; and D, the width of the display area of panel 1. As is apparent from FIG. 20, distribution L1 of light reflected by reflector 4 in light source 2 has a high intensity at the central portion but an extremely low intensity at the peripheral portion. However, distribution L2 of light passing through lens 13 has a relatively high intensity in the peripheral portion as compared with distribution L1, thus obtaining a substantially uniform intensity. When lenses 12 and 13 are arranged between light source 2 and panel 1, light with a high intensity is incident on the peripheral portion of panel 1, and thus a bright image can be displayed at the peripheral portion of panel 1.

What is claimed is:

1. A liquid crystal projector comprising:
   a light source;
   a transmission liquid crystal display panel irradiated with a light beam from said light source and having a rectangular display portion;
   a projection lens, arranged on a line extending from an optical axis obtained by connecting said light source and said liquid crystal display panel, for enlarging an image displayed on said liquid crystal panel onto a screen; and
   optical means, arranged between said light source and said liquid crystal display panel, for narrowing the light beam along a widthwise direction of said rectangular display portion of said liquid crystal display panel, wherein said optical means comprises an eccentric linear Fresnel lens, the center of which is deviated from the optical axis of said light source by a predetermined distance.

2. A projector according to claim 1, wherein said liquid crystal display panel (1) has primary-color filters (RF, GF, BF) shaped like a stripe, arranged side by side, and extending in a direction in which the light beam is narrowed by said optical means.

3. A liquid crystal projector comprising:
   a light source;
   a transmission liquid crystal display panel irradiated with light from said light source and having a rectangular display portion;
   a projection lens, arranged on a line extending from an optical axis obtained by connecting said light source and said liquid crystal display panel, for enlarging an image displayed on said liquid crystal display panel onto a screen; and
   optical means, arranged between said light source and said liquid crystal display panel, for narrowing the light from said light source along a widthwise direction of said rectangular display portion of said liquid crystal display panel and for correcting narrowed light into light parallel to the optical axis, wherein said optical means comprises a first linear Fresnel lens for narrowing the light from said light source along a widthwise direction of said rectangular display portion of said liquid crystal display panel, and a second linear Fresnel lens for correcting the light narrowed by said first Fresnel lens into light parallel to the optical axis of said light source.

4. A projector according to claim 3, wherein said first linear Fresnel lens has a convex lens function and said second linear Fresnel lens has a concave lens function.

5. A projector according to claim 4, wherein a distance between said first and second linear Fresnel lenses is sufficiently shorter than a focal length of said first linear Fresnel lens.

6. A projector according to claim 3, wherein said first and second linear Fresnel lenses respectively have convex lens functions, said second linear Fresnel lens being spaced apart from said first linear Fresnel lens by a focal length of said first linear Fresnel lens in such a manner that a lens surface of said second linear Fresnel lens is directed toward said first linear Fresnel lens.

7. A liquid crystal projector comprising:
   a light source;
   a transmission liquid crystal display panel irradiated with light from said light source, a width of the light from said light source being sufficiently larger than that of a display portion of said liquid crystal display panel;
   a projection lens, arranged on a line extending from an optical axis obtained by connecting said light source and said liquid crystal display panel, for enlarging an image displayed on said liquid crystal panel onto a screen;
   lens means, arranged between said light source and said liquid crystal display panel, for narrowing outer beams of the light from said light source in a inward direction of said display portion of said liquid crystal display panel; and
   lens means for correcting the light narrowed by said narrowing lens means into beams parallel to the optical axis extending toward said liquid crystal display panel, wherein said correcting lens means comprises a central flat surface portion having no lens function, the central beams of the light passing through said narrowing lens means being adapted to propagate straight through said central flat surface portion, and peripheral annular concave lens portions for receiving the outer beams focused by said narrowing lens means.

8. A projector according to claim 7, wherein said narrowing lens means comprises a central flat surface portion having no lens function, the central beams of the light from said light source being adapted to propagate straight through said central flat surface portion, and peripheral annular convex lens portions contiguous with said central flat surface portion.

9. A projector according to claim 8, wherein said correcting lens means is located at a position where the outer beams focused by said narrowing lens means cross the central beams passing through said flat surface portion of said narrowing lens means.

10. A liquid crystal projector comprising:
    a light source;
    a transmission liquid crystal display panel irradiated with a light beam from said light source and having a rectangular display portion;
    a projection lens, arranged on a line extending from an optical axis obtained by connecting said light source and said liquid crystal display panel, for enlarging an image displayed on said liquid crystal panel onto a screen; and
    optical means, arranged between said light source and said liquid crystal display panel, for narrowing the light beam along a widthwise direction of said rectangular display portion of said liquid crystal display panel, wherein said liquid crystal display panel has primary-color filters shaped like a stripe, arranged side by side, and extending in a direction in which the light beam is narrowed by said optical means.

* * * * *